United States Patent [19]

Orsos et al.

[11] Patent Number: 4,952,773
[45] Date of Patent: Aug. 28, 1990

[54] AUTOMATIC ARC-WELDING MACHINE OPERATING WITH ROD ELECTRODES AND A PREFERRED APPLICATION THEREOF

[75] Inventors: Kalman Orsos, Deggendorf; Gerhard Dietrich, Hengersberg; Alfons Berndl, Schaufling; Franz-Josef Kufner, Deggendorf, all of Fed. Rep. of Germany

[73] Assignee: Deggendorfer Werft und Eisenbau GmbH, Deggendorf, Fed. Rep. of Germany

[21] Appl. No.: 395,787

[22] Filed: Aug. 18, 1989

[30] Foreign Application Priority Data

Aug. 22, 1988 [DE] Fed. Rep. of Germany ....... 3828473

[51] Int. Cl.⁵ .............................................. B23K 9/12
[52] U.S. Cl. ........................... 219/124.34; 219/124.01; 219/125.1; 219/137.2
[58] Field of Search ............. 219/124.34, 125.1, 130.4, 219/137.2, 124.01

[56] References Cited

U.S. PATENT DOCUMENTS 2,195,962  4/1940  Hansen et al. .................... 219/137.2
4,772,776  9/1988  Siina ................................ 219/125.1

Primary Examiner—Clifford C. Shaw
Attorney, Agent, or Firm—Milde & Robinson

[57] ABSTRACT

An automatic arc welding machine of the type which operates with rod electrodes. The electrodes (46), which are held in a welding head (28), are moved automatically with respect to the workpiece. The electrodes are moved longitudinally away from the workpiece in accordance with the arc voltage such that a certain arc length is sustained. After use they are automatically replaced with new electrodes. For this purpose there is provided an arc striking control by means of which the particular electrode (46) is placed on the workpiece with the current limited to a value below the selected welding current; the electrode is then raised from the workpiece by an amount corresponding to the predetermined arc length while the welding current is released, before the longitudinal movement of the electrode in accordance with the arc voltage begins. A precisely timed and accurately placed ignition is achieved in this manner, even if the location of the weld is covered with scale or slag.

20 Claims, 6 Drawing Sheets

AUTOMATIC ARC-WELDING MACHINE OPERATING WITH ROD ELECTRODES AND A PREFERRED APPLICATION THEREOF

BACKGROUND OF THE INVENTION

The present invention relates to an automatic welding machine that operates with rod electrodes. The electrodes, which are held in a welding head and can be shifted about with respect to the workpiece, are moved longitudinally to the workpiece by the welding head in accordance with the arc voltage so as to sustain a certain arc length. After use, the electrodes are replaced automatically with new electrodes. An automatic welding machine of the type described above is generally disclosed in the German Patent Publication No. 36 19 761. In this prior art machine the voltage-dependant longitudinal movement of the electrodes is said to be performed under analog control by means of two electric motors—a DC motor and an AC motor—acting through a differential drive on a threaded spindle. The automated performance of arc welding work with welding rods is especially desirable where high-grade welds of unvarying quality are to be made in great number on one and the same workpiece. An example of such work is the permanently leak-proof welding of tube ends into header plates. With the present state of the art as many as 25,000 tubes are welded in a single unit.

The above-mentioned type of arc-welding machine leaves certain problems unsolved, however, with respect to practical applications. What has proven especially difficult in automated operations is the reliable striking of the arc at a predetermined location. For one thing, especially in the case of overlapping beads, contact can be made uncertain by scale or by slag such as develops from the electrode coating. Another problem is the danger of an electrode sticking, in the manner familiar to every manual arc welder.

SUMMARY OF THE INVENTION

Consequently, the invention has as its principal objective, in the case of an automatic arc welding machine operating with rod electrodes, of assuring that the quality of the welds will be uniform in every one of the many successive welding operations.

This objective, as well as other objectives which will become apparent from the discussion that follows are achieved, in accordance with the present invention, by providing an arc striking control device, by means of which the particular electrode, having the current limited to a value below the selected welding current, is placed against the workpiece while performing a rocking movement and then, with the full welding current present, the electrode is raised from the workpiece by an amount corresponding to the predetermined arc length before the start of the electrode's longitudinal, arc voltage-dependant movement.

The rocking movement imposed on the electrode when it is placed on the workpiece imitates, to a certain extent, the sweeping of the weld with the electrode the way an experienced hand welder does in order to strike the arc. However, limiting the current to an empirically determined level related to the electrode thickness provides additional protection against the danger of a stuck electrode. It has been found that with this procedure precise strikes are possible with high reliability, in the manner that is desirable particularly for program-controlled welding movements.

According to an advantageous feature of the present invention the welding machine includes a numerically controlled welding robot which is capable of performing separately programmable rocking movements in addition to following a programmed path as disclosed in German patent Publication No. 34 23 850; of a robot additionally controlled by a video camera as disclosed in German Patent Publication No. 34 05 909; and of the automatic welding of tubes in header plates with the aid of an optoelectronic centering system as disclosed in the German Patent Publication No. 34 03 055.

For a full understanding of the present invention, reference should now be made to the following detailed description of the preferred embodiments of the invention and to the accompanying drawings.

DESCRIPTION OF THE PREFERRED EMBODIMENT

Figure 1:
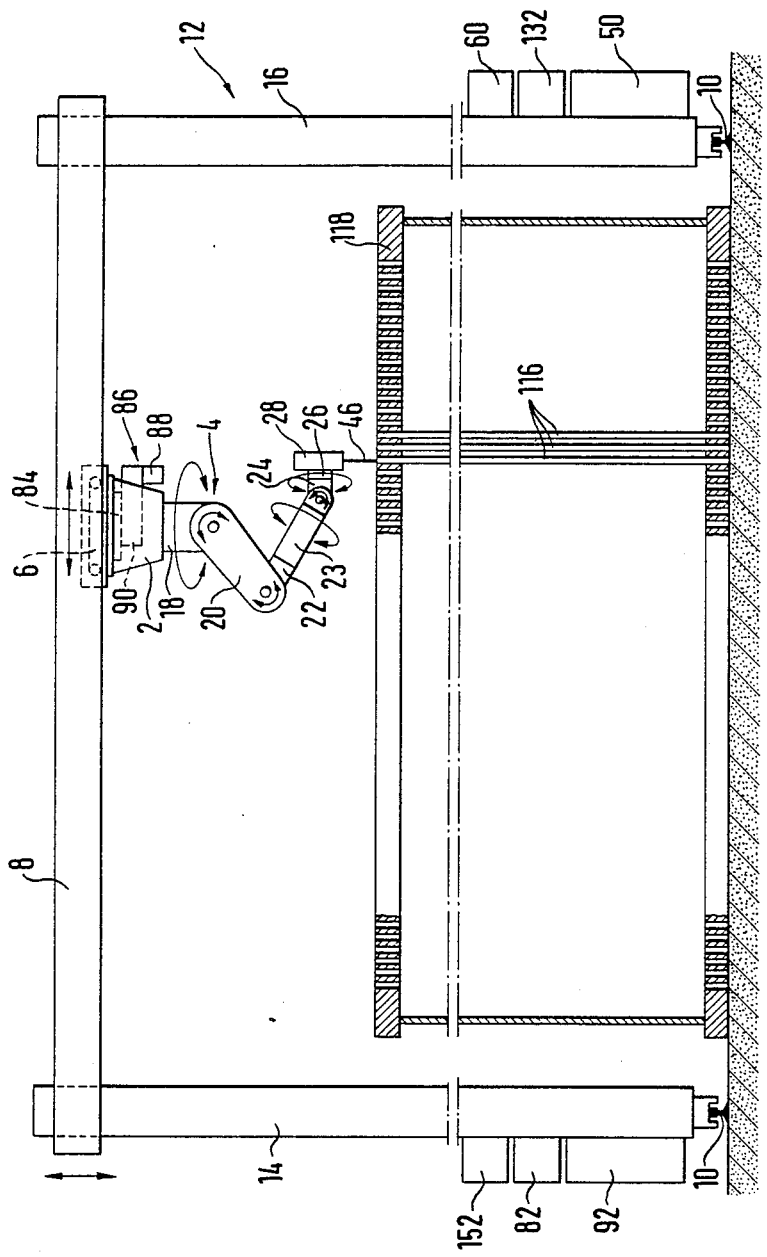
FIG. 1 is a somewhat diagrammatic overall view of the automatic welding machine in the form of a program-controlled welding robot.

As illustrated in FIG. 1, the bracket 2 of a welding robot 4 is mounted on the bottom of a carriage 6 which can move along the beam 8 of a portal frame 12 that travels on rails 10. The beam 8 can be moved up and down with respect to the two columns 14 and 16 of the portal frame 12 in a well-known manner and therefore not shown in detail. This arrangement enables the bracket 2 to be positioned as required in three orthogonal (perpendicular) coordinates.

The welding robot 4 has a shoulder member 18 rotatable with respect to the bracket 2 about a vertical axis, an upper arm member 20 articulated thereon for rotation about a horizontal axis, a forearm member 22 articulated to the free end of the upper arm member 20 and also rotatable on a horizontal axis and having an outside member 23 rotatable about its longitudinal axis, a wrist member 24 articulated to turn about a transverse axis on the outside member 23, and a hand member 26 which can rotate about the longitudinal axis of the wrist member 24 and is mounted on the latter, and which supports a welding head 28. Welding robots of this kind, having six degrees of freedom or "joints", are basically known in connection with shielding gas welding. They have a numerical program control by means of which the welding head can be positioned in every way in space, and very specific paths can be prescribed for it. It is also known to superimpose predetermined rocking movements on these paths, or else, as disclosed in the German Patent publication No. 34 23 850, to establish them in a subprogram.

Figure 2:
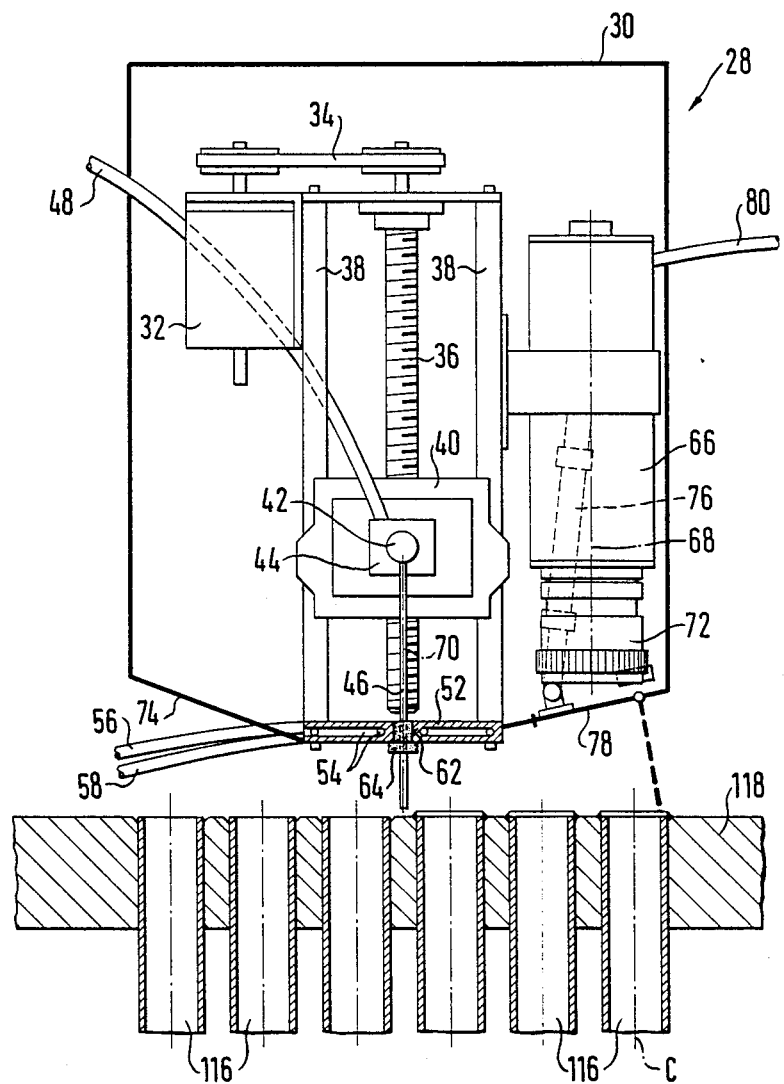
Fig. 2 is another somewhat diagrammatic view on a larger scale of the welding head which can be positioned under program control, with the housing opened, and employed in conjunction with a workpiece in the form of a tube header plate with tubes.

Referring to FIG. 2, the welding head 28 with which we are here concerned is of a type that is designed to burn sheathed electrodes. For this purpose it has, inside of a housing 30, a threaded spindle 36 which can be rotated by a stepping motor 32 through a cogbelt 34. On the spindle is mounted a nut block 40 which can run on two rails that extend parallel to the spindle axis. The nut block 40 supports an electrode holder 44 for holding the bare chucking end of a welding electrode 46. The clamp in the electrode holder can be opened and closed by means of a small air cylinder 42. The electrode holder 44, which itself consists substantially of copper, is electrically insulated from the nut block 40 and is connected by a sufficiently thick, insulated, flexible copper cable 48 to the positive terminal of the welding power source 50 (FIG. 5).

Figure 5:
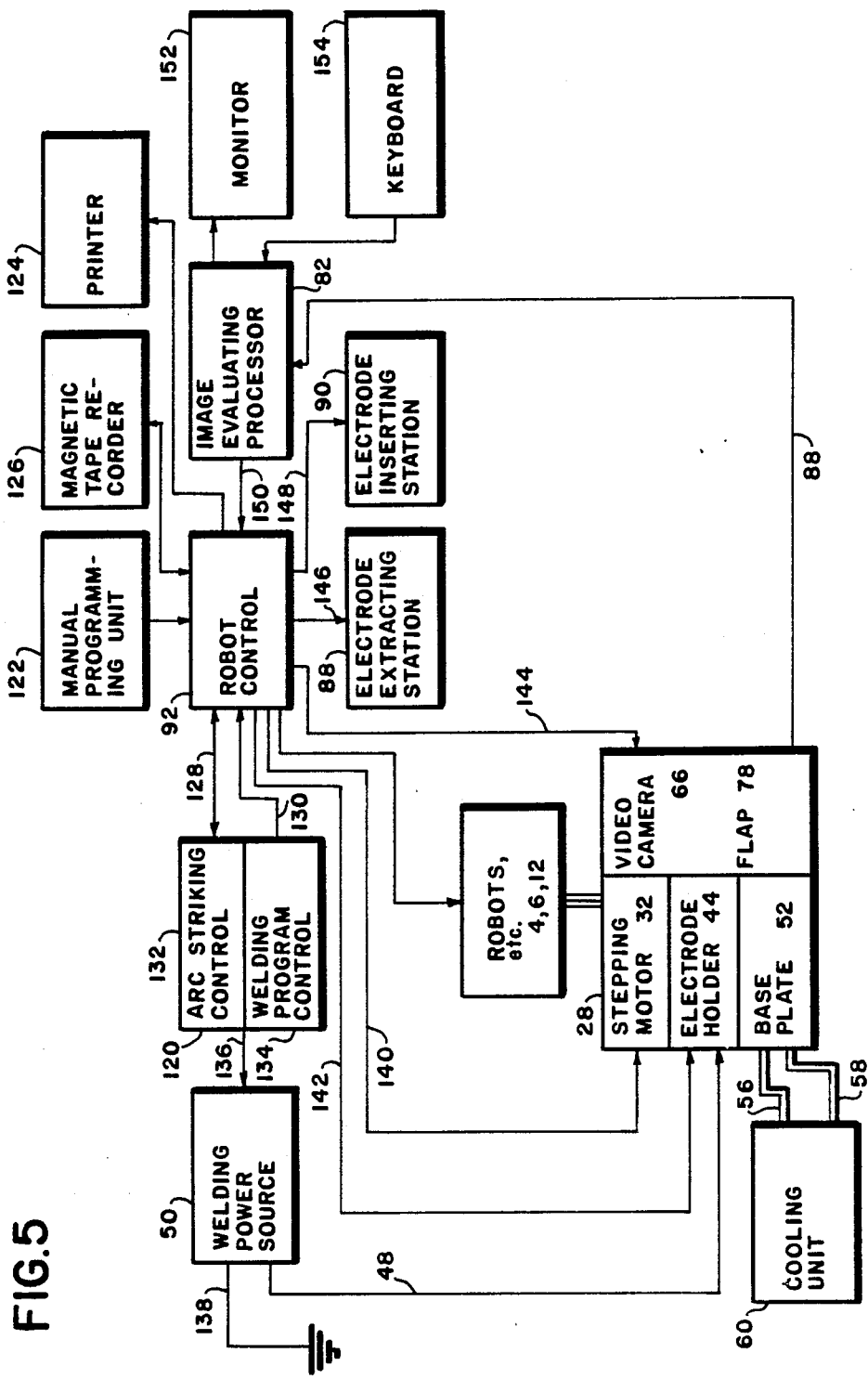
FIG. 5 is a block diagram of the most important components of the circuitry of the welding robot.

A bottom plate 52 of the housing 30 has within it a serpentine coolant passage 54 which is connected by hoses 56 and 58 to a cooling unit 60 (FIG. 5). In this manner the interior of the housing 30 is protected against absorbing an unacceptably high temperature from the weld. A ceramic bushing 64 is removably inserted into an opening 62 in the bottom plate 52 underneath the electrode holder 44, and its inside diameter corresponds to that of the welding electrode 46 such that the welding electrode is provided with additional guidance by this bushing.

In addition to the spindle drive consisting essentially of parts 32–40, a video camera is disposed in the housing 30 such that its optical axis 68 is parallel to the axis of the threaded spindle 36 and thus also to the electrode axis 70, and the lens 72 of the camera is aimed at the bottom 74 of the housing 30. This bottom has at an appropriate point outside of the bottom plate 52 an opening which can be closed by a flap 78 controlled by a small air cylinder 76, in order to expose the camera lens to view the exterior and, on the other hand, to protect the interior of the housing 30 and above all the lens 72 of the camera against welding splatter and vapor and against dust and other contamination. The camera 66 is connected by an appropriate cable 80 to a video processor 82 (FIG. 5).

On a plate 84 (FIG. 1) projecting from the bracket 2 of the welding robot 4 there is an electrode changer indicated as a whole by the number 86, which has an electrode extracting station 88 and an electrode inserting station 90, which are separate from one another. The two stations can be visited by the welding head 28 under the guidance of the numerical robot control 92 (FIG. 5).

Figure 3:
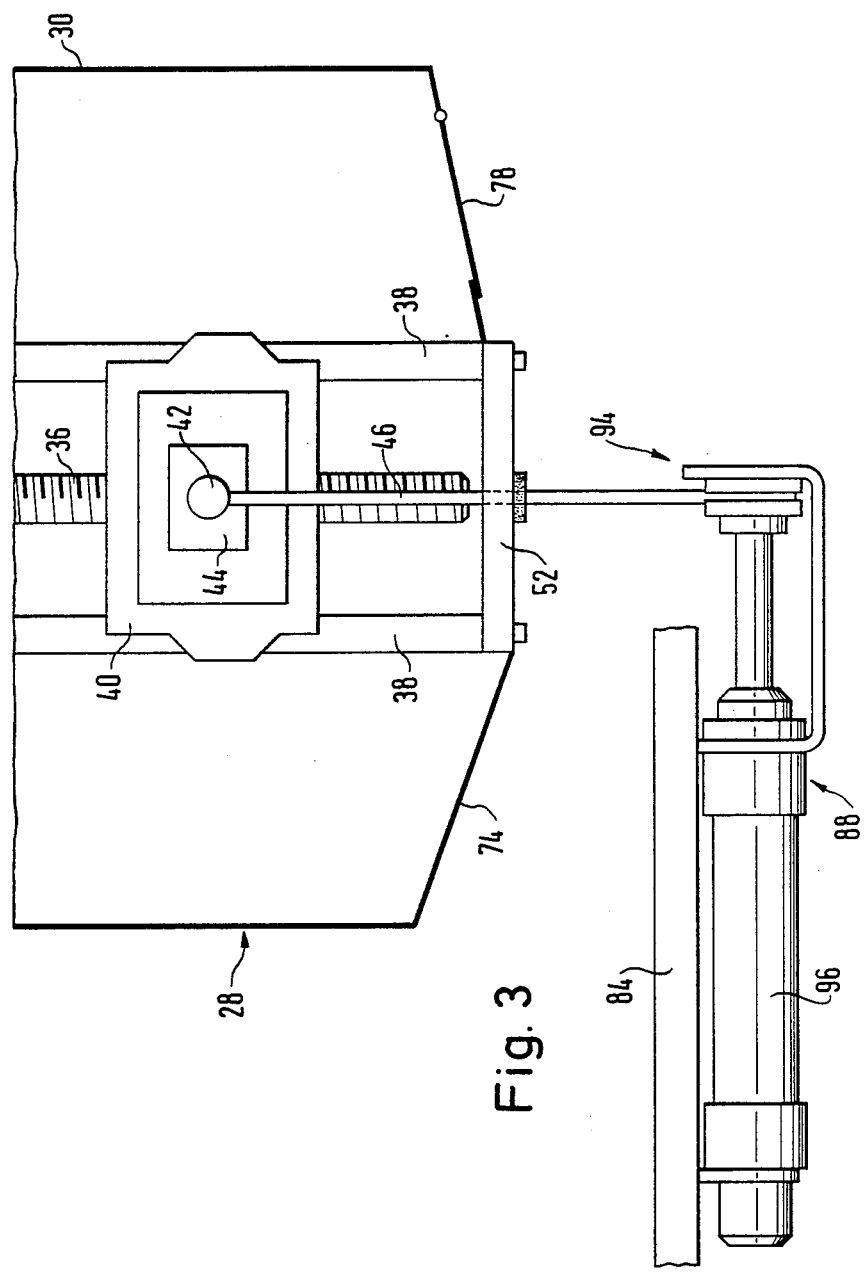
FIG. 3 shows the welding head in position in front of a welding rod extracting station forming a component of a rod changing system.

Referring now to FIG. 3, the electrode extracting station 88 consists essentially of a gripper 94 which can be opened and closed by a small air cylinder 96. When the electrode extracting station 88 is visited by the welding head bearing an electrode stub 46, the stub is seized by the gripper 94 and immediately thereafter released by the electrode holder 44. Then the welding head 28 is moved away from the gripper in the direction of the axis of the electrode 46, and finally the electrode is dropped by the gripper. The welding head 28 then moves to the electrode inserting station 90.

Figure 4:
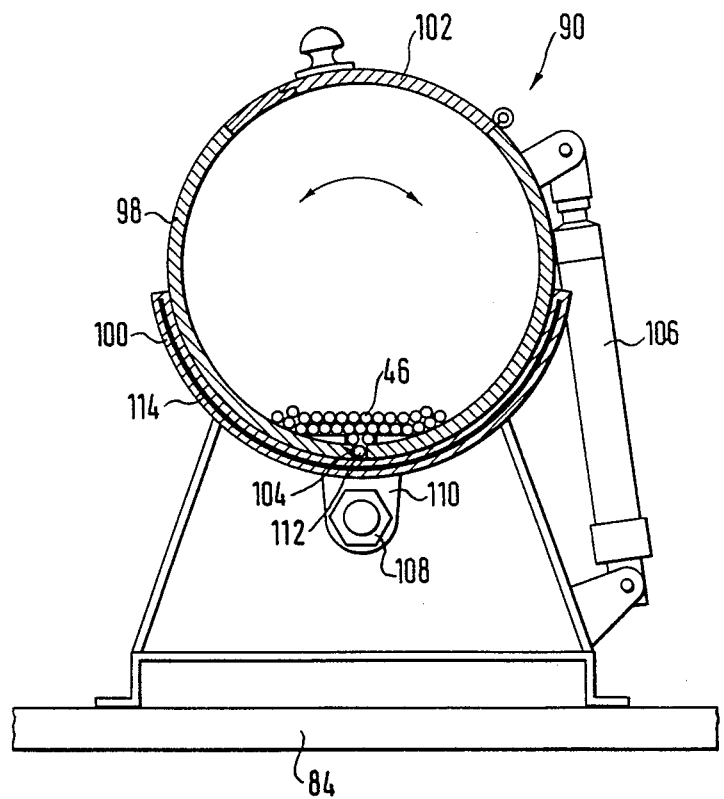
FIG. 4 is a cross section through a welding rod inserting station forming an additional component of the electrode changing system.

Referring now to FIG. 4 the electrode inserting station 90 has a horizontal drumlike container 98 which is cradled at the bottom in a wall 100 and is rotatable about its central axis. Through an opening at the top, which can be closed by a lid 102, the container 98 can be filled with a day's supply of, for example, 500 welding electrodes 46. Along a generatrix normally on the bottom there is a slot 104 in the container 98; this slot is just large enough to receive one electrode. A small air cylinder 106 can rock the container 98 back and forth by a small angular amount, with the result that one of the electrodes 46 stored in the container will be certain to fall into the slot 104. To the plunger of an additional small air cylinder 108 is connected an ejector 112 which can enter from the end (from the rear in FIG. 4) into the slot 104 and partially push out an electrode 46 contained therein.

The partially extended electrode 46 is received and gripped by the electrode holder 44 of the ready welding head 28 and, as the welding head moves away, it is drawn all the way out of the slot 104. When the welding head 28 then approaches its next working position, the electrode 46 thus held is drawn by the spindle drive 32-40 into a starting position in the welding head, in which only its consumable end protrudes slightly out of the ceramic bushing 64. All these movements are performed, as stated, automatically, namely by means of the appropriately modified robot control 92.

To keep the interior of the container 98 at a temperature above 100 degrees C., the wall 100 has an electrical heater 114. It is then recommended to heat the electrodes 46 to a temperature of more than 350 degrees C. before putting them into the container 98. In this manner the moisture present in the electrode sheath, including bound water, can be driven out and the penetration of further moisture can be prevented, thereby improving seam quality.

In FIG. 2 the welding robot thus far described is used for welding the numerous tubes 116 in a header plate 118. The individual tube positions are specified by the program in the form of the central axis C of the tube, for example. However, even if boring machines of extreme precision are used in making the head plate, the individual tube axes C will be to some extent out of their specified position. Since the precision of the welds would suffer from this, a fine adjustment is performed through the video camera 66. For this purpose first only the camera 66 is positioned by means of the stored program. With the flap 78 open, the camera forms an image which is then evaluated by the image analyzing processor 82 such that it provides information on the aberration of the optical axis 68 of the camera from the tube axis C. With this information the position assumed by the welding head 28 is then corrected, while at the same time the offset of the electrode axis 70 from the optical axis 68 is also corrected. Lastly, again by means of the numerical robot control 92, the electrode axis 70 is brought in the same or in a subsequent step to the predetermined starting point of the weld.

When that starting point is reached, an arc striking control 120 (FIG. 5), connected to the robot control 92 and to the welding power source 50, limits the current supplied to the welding electrode 46 to an empirically determined preset level below the anticipated welding current, and causes the robot control 92 to place the welding electrode 46 onto the workpiece (tube head plate 118) while simultaneously performing a rocking movement. Immediately thereafter, the welding current is applied and the electrode 46 is withdrawn from the workpiece by an amount corresponding to the likewise predetermined arc length. In this manner a precisely located, instantaneous ignition of the arc is accomplished in a highly reliable manner. After this is done, the robot control 92 and the spindle drive 32–40 continually perform an automatic regulation of the arc length by means of the sensed arc voltage, during which time the welding electrode 46 is advanced through the ceramic bushing 62 by the spindle drive at the rate that it burns away.

In the meantime, the programmed movement of the welding head 28 on its path continues with a rocking movement superimposed according to the program, in order to produce the desired weld. Since the arc length is controlled constantly and automatically, the weld seam can follow any unevenness of the workpiece, and seams can also overlap one another. In this manner, multiple layer welds can be produced by traveling the same path or even different paths if desired. It has been found that the above-described arc striking method is successful even if a previously made seam is still covered with slag, as it regularly happens when welding with sheathed welding rods. This slag has the advantage, among others, that the seam is protected against too rapid cooling, which might result in brittleness.

In FIG. 5, the components already referred to above plus additional important components of the welding robot thus far described are represented diagrammatically along with the way in which they work together. As it can be seen, the drives of the portal frame 12 together with its carriage 6 are associated with the appropriately modified robot control 92 along with those of the robot 4 itself. Furthermore, a manual programming unit 122, a printer 124 and, as data storage, a magnetic tape unit are attached to the robot control 92 in a manner familiar to the robotics engineer. In addition, a welding control 132 is in communication with the robot control 92 through control lines 128 and 130; in this device the previously mentioned arc striking control 120 is combined with a welding program control 134. This welding control 132 acts through a control line 136 on the welding current source 50 in order to determine magnitude and the timing of the welding current obtainable therefrom. From the welding current source 50 the already mentioned copper cable 48 runs to the welding head 28, or more precisely to its electrode holder 44, while another such cable 138 runs from the welding current source 50 to the workpiece (not shown in FIG. 5) for example in the form of the above-mentioned tube head plate 118.

Additional control lines, 140, 142, 144, 146 and 148 run from the robot control 92 to the stepping motor 32, the gripping means 44 and the video camera 66 with its flap 78 on the welding head 28, and to the electrode extracting station 88 and the electrode inserting station 90. The two hoses 56 and 58 on the side of the welding head 28 are, as stated, connected to the inlet and outlet of the cooling unit 60 which has a circulation pump and by which the warmed cooling water from the welding head is recooled for reuse. Then the video camera 66 in the welding head 28 is connected by the cable 80 to the image evaluating processor 82 from which a control line 150 leads to the robot control 92. Lastly, a monitor 152 plus a keyboard 154 is connected to the image processor 82 for the visual display of the image scanned by the camera 66.

Figure 6:
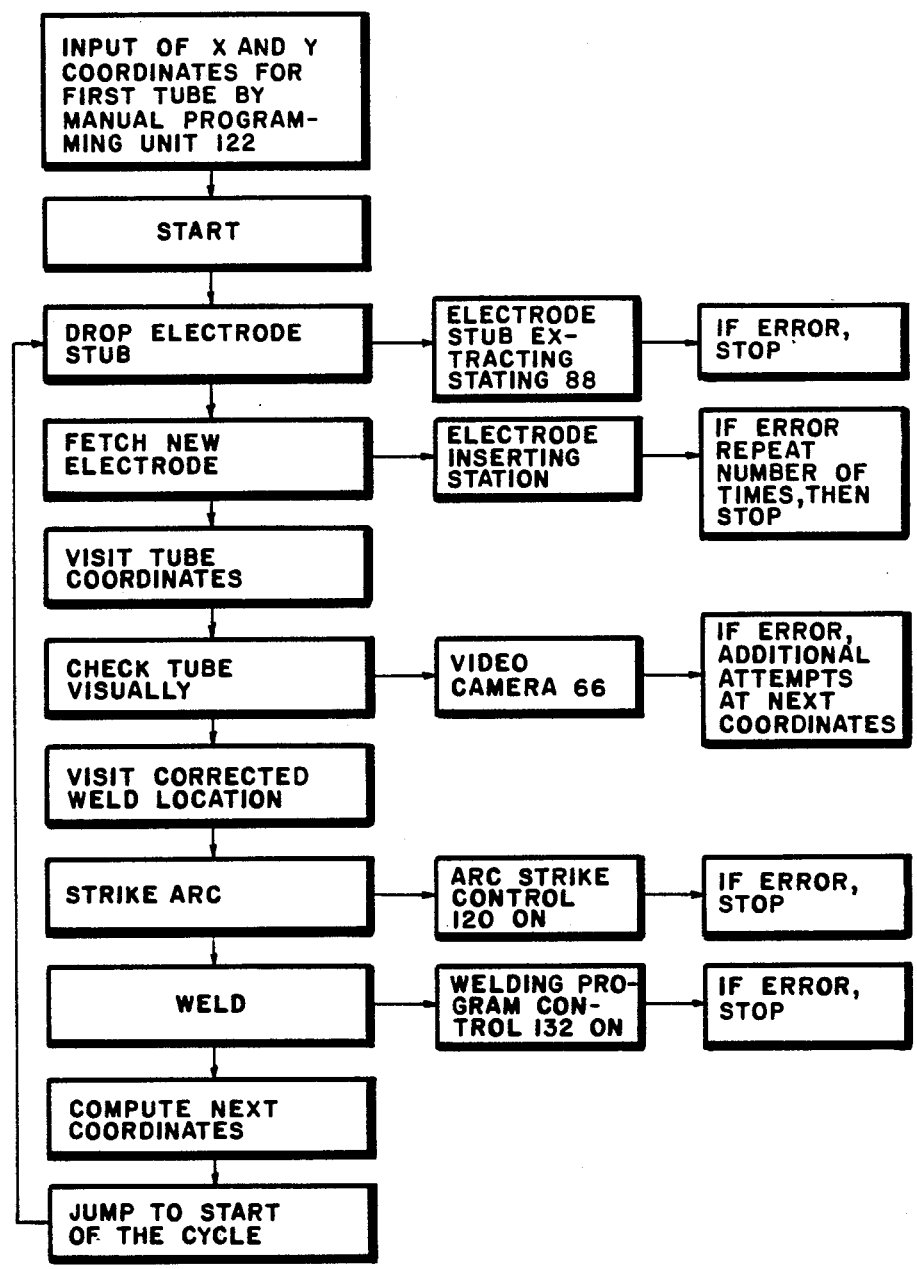
FIG. 6 is a flow diagram for the same welding robot.

As represented in FIG. 6, the operation of the automatic welding machine thus far described is essentially as follows, assuming that it involves the welding of tubes into a header plate:

First, the coordinates of a first tube are entered by means of the manual programming unit 122. Then, upon a start signal, the welding head 28, controlled by the robot control 92, successively visits the electrode extracting station 88 and the electrode insertion station 90 to drop off an electrode stub, if any, and to pick up a fresh electrode 46. Thereafter the welding head goes to the programmed position of the first tube, whereupon the video camera 66 detects its actual position and reports it through the image processor 82 to the robot control 92. The robot control then performs a fine positioning while the electrode 46 is guided simultaneously to the starting point of the intended weld. When it arrives at that point the arc is struck by means of the arc striking control 120 in the manner described, on the basis of a signal from the robot control 92. During the welding operation that follows, the electrode together with the welding head 28, under the guidance of the robot control 92 in conjunction with the welding program control 134, performs a programmed movement along a path with a superimposed rocking movement. During this movement, or immediately thereafter, a computer integral with the robot control 92 computes, on the basis of guidance data also entered through the manual programming unit 122, the coordinates for the position of the next tube to be welded in place. When this is done or when the welding of the preceding tube is completed, the robot control 92 returns to the start of the cycle ("drop electrode stub") and a new cycle begins.

A variation can be made if a fresh electrode is necessary for the striking of the arc, say with the establishment of a second weld location. In this case the welding head 28 will go successively to the electrode extracting and the electrode insertion stations, and then immediately, without the intervention of the video camera 66, return to its starting position to continue the welding operation.

As described above, when there are a plurality of weld locations occurring at regular intervals it is not necessary to enter the position of each single one of them through the manual programming unit. Instead, in this case the computer integrated into the robot control 92 will operate to establish additional positions, at least by interpolation, which then become recorded by means of the magnetic tape storage unit 126 as components of the program.

There has thus been shown and described a novel automatic arcwelding machine which fulfills all the objects and advantages sought therefor. Many changes, modifications, variatins and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. In an automatic arc welding machine comprising a welding head; means for moving said welding head under program control; a replaceable rod electrode held in the welding head; means for automatically moving the electrode in relation to the welding head in the longitudinal direction of the electrode in dependence upon the arc voltage so as to sustain a certain arc length; and means for automatically replacing the electrode after use with a new electrode; the improvement comprising arc striking control means for placing the electrode on the workpiece while performing a rocking movement with the current limited to a value below the selected welding current, and then raising the electrode from the workpiece by an amount corresponding to a predetermined arc length with the full welding current applied thereto before beginning a longitudinal movement of the electrode in dependence upon the arc voltage.

2. The automatic arc welding machine of claim 1, wherein the welding head comprises means for additionally supporting the electrode in the vicinity of its consumable end.

3. The automatic arc welding machine of claim 2, wherein said additional supporting means is a ceramic bushing.

4. The automatic arc welding machine of claim 2, further comprising means for cooling the welding head in the region of said additional supporting means.

5. The automatic arc welding machine of claim 4, wherein said cooling means uses water as a cooling medium.

6. The automatic arc welding machine of claim 1, wherein said welding head moving means includes numerical control and stepping motor means for performing the longitudinal movement of the electrode.

7. The arc welding machine of claim 1, further comprising a separate electrode changing device having separate electrode extracting and electrode inserting stations that are visited successively by the welding head.

8. The automatic arc welding machine of claim 7, wherein the electrode extracting station comprises a gripper that closes automatically around the residual electrode.

9. The automatic arc welding machine of claim 7, wherein the electrode inserting station comprises (a) a drum-like, rotatable container for horizontally accommodating a supply of electrodes, said container having a surrounding wall with a slot therein for receiving a single electrode; and (b) a plunger for pushing the single electrode out one end of the container.

10. The automatic arc welding machine of claim 9, wherein the electrode inserting station further comprises means for rocking the container back and forth by a certain angle.

11. The automatic arc welding machine of claim 9, wherein the electrode inserting station further comprises means for heating the container.

12. The automatic arc welding machine of claim 7, wherein the welding head is a component of a numerically controlled welding robot.

13. The automatic arc welding machine of claim 12, wherein said welding robot comprises a numerical robot control for controlling the movements of the welding head, thereby to successively visit the electrode extracting and the electrode inserting stations.

14. The automatic arc welding machine of claim 13, wherein the electrodes introduced into the welding head at the electrode inserting station are drawn into the welding head to their starting position during the next-following motion of the welding head to the weld location.

15. The automatic arc welding machine of claim 13, further comprising a position sensor at least partially in said welding head, and wherein the numerical robot control at first only roughly positions the welding head and thereafter performs a fine positioning on the basis of a signal from the position sensor.

16. The automatic arc welding machine of claim 15, wherein the position sensor comprises a video camera and an image evaluating processor connected to the video camera.

17. The automatic arc welding machine of claim 16, wherein the video camera has an optical axis which is oriented parallel to the electrode axis and the robot control first positions the video camera and then performs a parallel displacement of the welding head by the axial distance between camera and electrode, corrected according to the output signal of the image evaluating processor.

18. The automatic arc welding machine of claim 16, wherein the position sensor includes means for covering at least the lens of the video camera during the welding process.

19. The automatic arc welding machine of claim 13, wherein the robot control is operable to superimpose a predeterminable rocking movement on the numerically controlled path movement.

20. The automatic arc welding machine of claim 1, further comprising a plurality of welding tubes and at least one header plate, said machine being arranged and operable to weld the tubes into the header plate.

* * * * *